US010243691B2

United States Patent
Lappalainen

(10) Patent No.: US 10,243,691 B2
(45) Date of Patent: Mar. 26, 2019

(54) APPARATUSES AND METHODS FOR AVOIDING VIDEO ARTIFACTS INTRODUCED BY A HANDOVER OR OUT-OF-SERVICE (OOS) CONDITION DURING A VIDEO CALL

(71) Applicant: MediaTek Singapore Pte. Ltd., Singapore (SG)

(72) Inventor: Kristian Lappalainen, Oulu (FI)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 92 days.

(21) Appl. No.: 15/257,403

(22) Filed: Sep. 6, 2016

(65) Prior Publication Data

US 2018/0069655 A1    Mar. 8, 2018

(51) Int. Cl.
| | |
|---|---|
| *H04L 1/00* | (2006.01) |
| *H04L 12/26* | (2006.01) |
| *H04L 29/06* | (2006.01) |
| *H04W 80/10* | (2009.01) |
| *H04W 88/06* | (2009.01) |

(52) U.S. Cl.
CPC .......... *H04L 1/0017* (2013.01); *H04L 43/087* (2013.01); *H04L 65/1089* (2013.01); *H04L 65/605* (2013.01); *H04L 65/80* (2013.01); *H04L 65/608* (2013.01); *H04W 80/10* (2013.01); *H04W 88/06* (2013.01)

(58) Field of Classification Search
CPC ............................ H04L 1/0017; H04L 43/087
USPC ........................................................ 370/225
See application file for complete search history.

(56) References Cited

U.S. PATENT DOCUMENTS

| | | | | |
|---|---|---|---|---|
| 6,480,541 B1 * | 11/2002 | Girod | .................. | H04N 9/8042 |
| | | | | 375/240.12 |
| 6,611,674 B1 * | 8/2003 | Jokimies | ............... | H04L 1/0014 |
| | | | | 348/192 |
| 8,751,881 B1 * | 6/2014 | Terry | ................... | H04L 1/0044 |
| | | | | 714/708 |
| 2004/0264563 A1 * | 12/2004 | Inoue | ...................... | H04N 7/14 |
| | | | | 375/240.01 |

(Continued)

FOREIGN PATENT DOCUMENTS

| | | |
|---|---|---|
| CN | 102710401 A | 10/2012 |
| WO | 2014/073170 A1 | 5/2014 |

*Primary Examiner* — Peter G Solinsky
(74) *Attorney, Agent, or Firm* — McClure, Qualey & Rodack, LLP

(57) ABSTRACT

A communication device including various circuitry is provided. The first and second circuitry provide a first communication link to a remote device using a first access technology and a second communication link to the remote device using a second access technology, respectively. The third circuitry detects whether a video call has been handed over from the first communication link to the second communication link, or whether an OOS condition of the first or second communication link that occurred during the video call has ended. The fourth circuitry generates a first intra frame for the remote device or requests that the remote device generate a second intra frame for the communication device, when the video call has been handed over from the first communication link to the second communication link or when the OOS condition occurred during the video call has ended.

8 Claims, 6 Drawing Sheets

(56) References Cited

U.S. PATENT DOCUMENTS

| | | | |
|---|---|---|---|
| 2007/0064901 A1* | 3/2007 | Baird | H04N 7/152 379/202.01 |
| 2008/0056218 A1* | 3/2008 | Binzel | H04L 1/1874 370/342 |
| 2010/0208668 A1* | 8/2010 | Dumazy | H04N 7/147 370/329 |
| 2014/0369422 A1* | 12/2014 | Wang | H04N 21/44021 375/240.26 |
| 2016/0302128 A1* | 10/2016 | Anchan | H04W 36/30 |
| 2017/0055184 A1* | 2/2017 | Hajj-Ahmad | H04W 36/0055 |
| 2017/0180736 A1* | 6/2017 | Yang | H04N 19/154 |

* cited by examiner

APPARATUSES AND METHODS FOR AVOIDING VIDEO ARTIFACTS INTRODUCED BY A HANDOVER OR OUT-OF-SERVICE (OOS) CONDITION DURING A VIDEO CALL

BACKGROUND OF THE APPLICATION

Field of the Application

The application generally relates to real-time video communication services, and more particularly, to apparatuses and methods for avoiding video artifacts introduced by a handover or Out-Of-Service (OOS) condition during a video call.

Description of the Related Art

With growing demand for ubiquitous computing and networking, various access technologies have been developed, such as the Ethernet technology, the Wireless Local Area Network (WLAN) technologies, including the Wireless-Fidelity (WiFi) technology, and Bluetooth (BT) technology, etc., and also, the cellular technologies, including the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) technology, Time Division-Synchronous Code Division Multiple Access (TD-SCDMA) technology, Worldwide Interoperability for Microwave Access (Wi-MAX) technology, Long Term Evolution (LTE) technology, Time-Division LTE (TD-LTE) technology, and LTE-Advanced (LTE-A) technology, etc.

For user convenience and flexibility, a general User Equipment (UE) (also may be referred to as Mobile Station (MS)) nowadays supports more than one access technology. A UE supporting both the LTE technology and WiFi technology, for example, may selectively obtain communication services using the LTE technology or the WiFi technology. Generally, when communication services are available from both a WiFi Access Point (AP) and an LTE network, the UE currently camped on the LTE network may be handed over from the LTE network to the WiFi AP, e.g., in case the user is concerned that the WiFi AP may be more likely to provide communication services with a higher bandwidth than the LTE network.

However, if two UEs are having an ongoing data transfer with each other, the handover of either one of the UEs across different access technologies causes a gap in the data transfer. FIG. 1 is a schematic diagram illustrating such a data transfer specific to video call services undergoing a handover. As shown in FIG. 1, the gap not only causes the video call to pause for some time, but also results in video artifacts appearing in the video stream due to lost inter frames. Specifically, the video artifacts will continue to exist until the next intra frame is received for the video to get back in-sync. In addition to handovers, the same problem exists in situations where either one of the UEs in a video call is experiencing an Out-Of-Service (OOS) condition.

Thus, it is desirable to avoid video artifacts introduced by handovers or OOS conditions during a video call, so that users may experience smooth streaming of the video call.

BRIEF SUMMARY OF THE APPLICATION

In one aspect of the application, a communication device in a video call with a remote device is provided. The communication device comprises various circuitry. The first circuitry is configured to provide a first communication link to the remote device using a first access technology. The second circuitry is configured to provide a second communication link to the remote device using a second access technology. The third circuitry is configured to detect whether the video call has been handed over from the first communication link to the second communication link, or whether an Out-Of-Service (OOS) condition of the first or second communication link that occurred during the video call has ended. The fourth circuitry is configured to generate a first intra frame for the remote device or request that the remote device generate a second intra frame for the communication device, when the video call has been handed over from the first communication link to the second communication link or when the OOS condition occurred during the video call has ended.

In another aspect of the application, a method for avoiding video artifacts introduced by a handover or OOS condition during a video call between a communication device and a remote device, executed by the communication device comprising a video encoder circuitry, is provided. The method comprises the steps of: providing a first communication link to the remote device using a first access technology and a second communication link to the remote device using a second access technology; detecting whether the video call has been handed over from the first communication link to the second communication link, or whether an OOS condition of the first or second communication link that occurred during the video call has ended; and generating, by the video encoder circuitry, a first intra frame for the remote device or requesting that the remote device generate a second intra frame for the communication device, when the video call has been handed over from the first communication link to the second communication link or when the OOS condition occurred during the video call has ended.

Other aspects and features of the present application will become apparent to those with ordinarily skill in the art upon review of the following descriptions of specific embodiments of the communication devices and the methods for avoiding video artifacts introduced by a handover or OOS condition during a video call between a communication device and a remote device.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The 3rd Generation Partnership Project (3GPP) specifications are used to teach the spirit of the application, and the application is not limited thereto.

Figure 1:
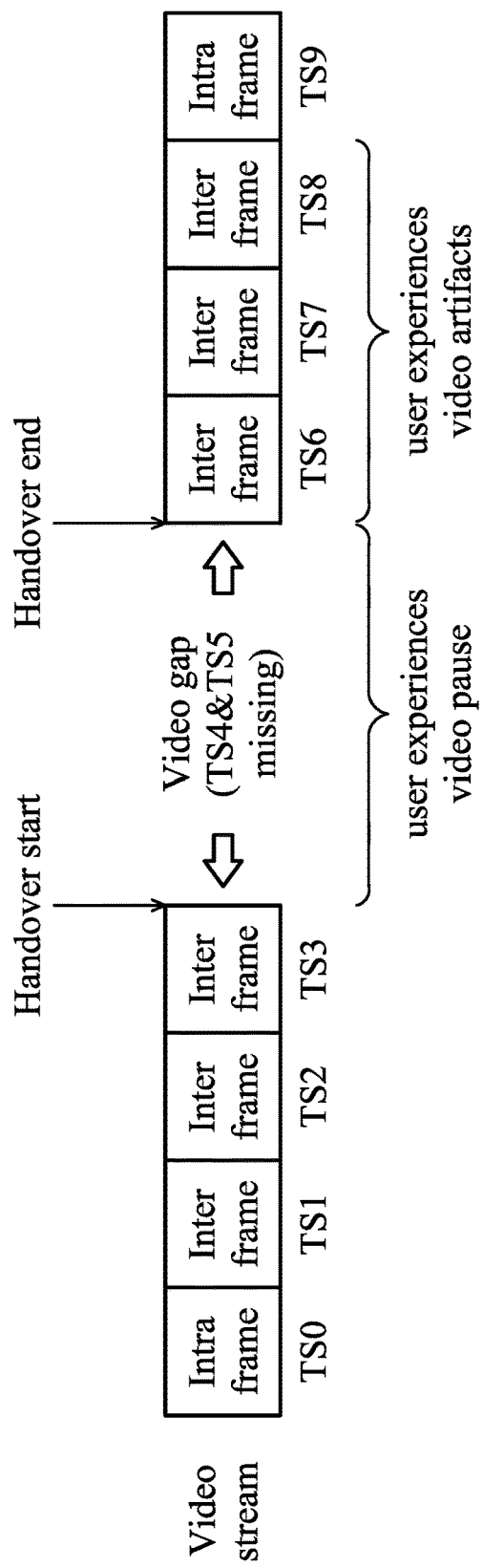
FIG. 1 is a schematic diagram illustrating a data transfer specific to video call services undergoing a handover.
Figure 2:
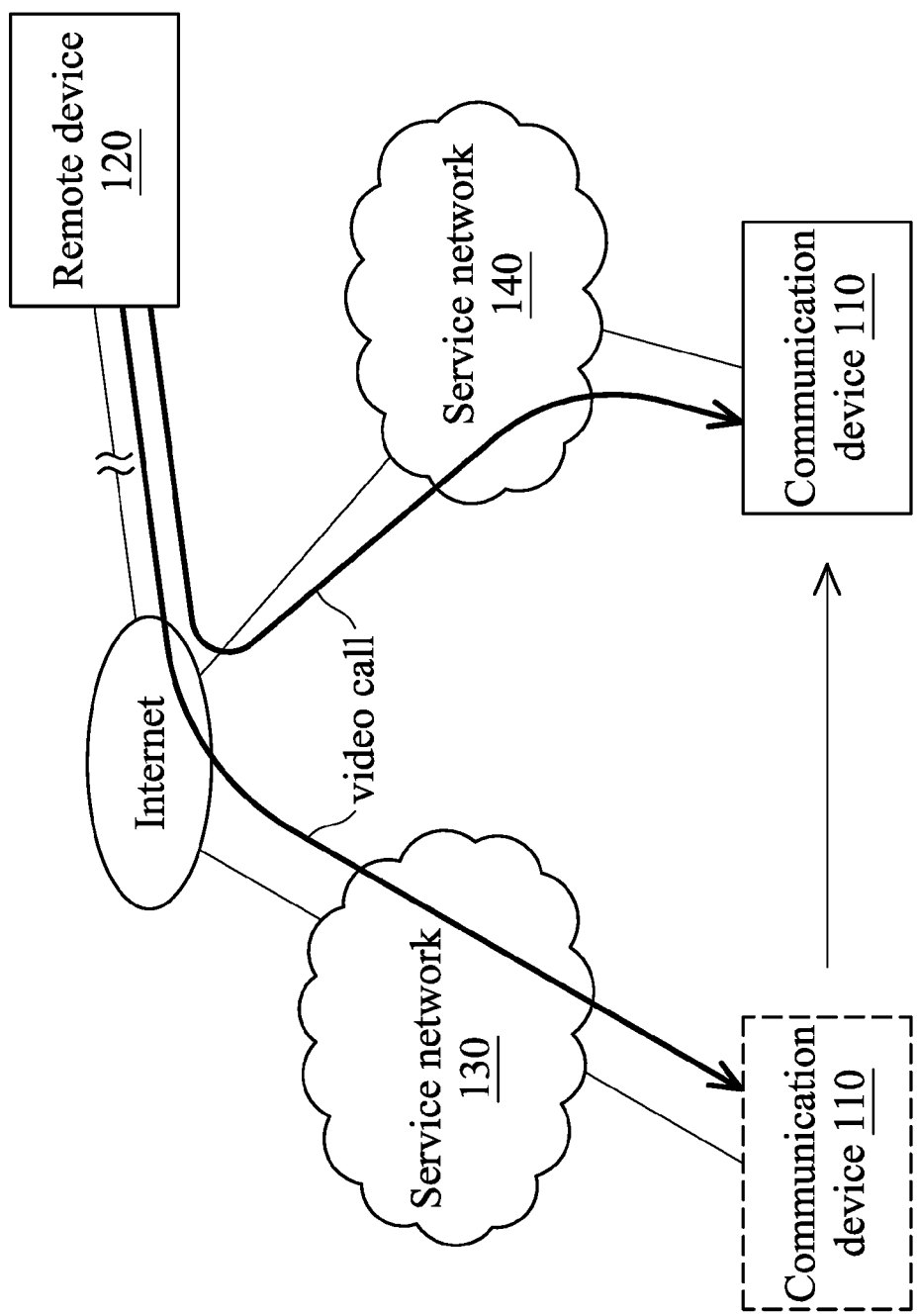
FIG. 2 is a block diagram of a wireless communication environment according to an embodiment of the application.

FIG. 2 is a block diagram of a wireless communication environment according to an embodiment of the application. The wireless communication environment 100 comprises a communication device 110, a remote device 120, and two service networks 130 and 140, wherein the service networks 130 and 140 are connected to the Internet. In one embodiment, the service networks 130 and 140 are deployed by the same service provider. In another embodiment, the service network 130 and 140 are deployed by different service providers.

The communication device 110 may be referred to as a User Equipment (UE) or Mobile Station (MS), such as a feature phone, a smartphone, a panel Personal Computer (PC), a laptop computer, or any computing device supporting both of the access technologies utilized by the service networks 130 and 140. Similarly, the remote device 120 may be a feature phone, a smartphone, a panel PC, a laptop computer, or any computing device that is capable of connecting to the Internet for making a video call with the communication device 110. In particular, the video call may be made using any video telephony solution that supports handovers across different access technologies.

Each of the service networks 130 and 140 supports a respective access technology, including a wired technology, such as the Ethernet technology, cable modem technology, Asymmetric Digital Subscriber Line (ADSL) technology, or Fiber-Optic Modem (FOM) technology, and a wireless technology, such as the WLAN technology (e.g., WiFi/BT technology), 2G technology (e.g., GSM/GPRS/EDGE technology), 3G technology (e.g., a WCDMA/CDMA2000/TD-SCDMA technology), 4G technology (e.g., LTE/LTE-A/TD-LTE technology), or WiMAX technology. For example, the service networks 130 and 140 may be a WiFi network and an 4G network, or a 2G network and a 3G network, or a WiFi network and an Ethernet network, respectively, etc.

If the service network 130 or 140 is a cellular network (e.g., 2G/3G/4G/WiMAX network), it may comprise an access network and a core network, wherein the access network is responsible for processing radio signals, terminating radio protocols, and connecting the communication device 110 with the core network, while the core network is responsible for performing mobility management, network-side authentication, and interfaces with public/external networks (e.g., the Internet). Each of the access network and the core network may comprise one or more network nodes for carrying out said functions.

Taking the 2/3G network as an example, the access network may be a GSM EDGE Radio Access Network (GERAN) which includes at least a Base Transceiver Station (BTS) and a Base Station Controller (BSC) or may be a UTRAN which includes at least a Node B and a Radio Network Controller (RNC), and the core network may be a GPRS core which includes at least a Mobile Switching Center (MSC), Home Location Register (HLR), Serving GPRS Support Node (SGSN), and Gateway GPRS Support Node (GGSN).

Taking the 4G network as an example, the access network may be an Evolved-UTRAN (E-UTRAN) which includes at least two evolved NodeBs (eNBs) (e.g., macro eNB, femto eNB, or pico eNB), and the core network may be an Evolved Packet Core (EPC) which includes a Home Subscriber Server (HSS), Mobility Management Entity (MME), Serving Gateway (S-GW), and Packet Data Network Gateway (PDN-GW or P-GW).

Figure 3:
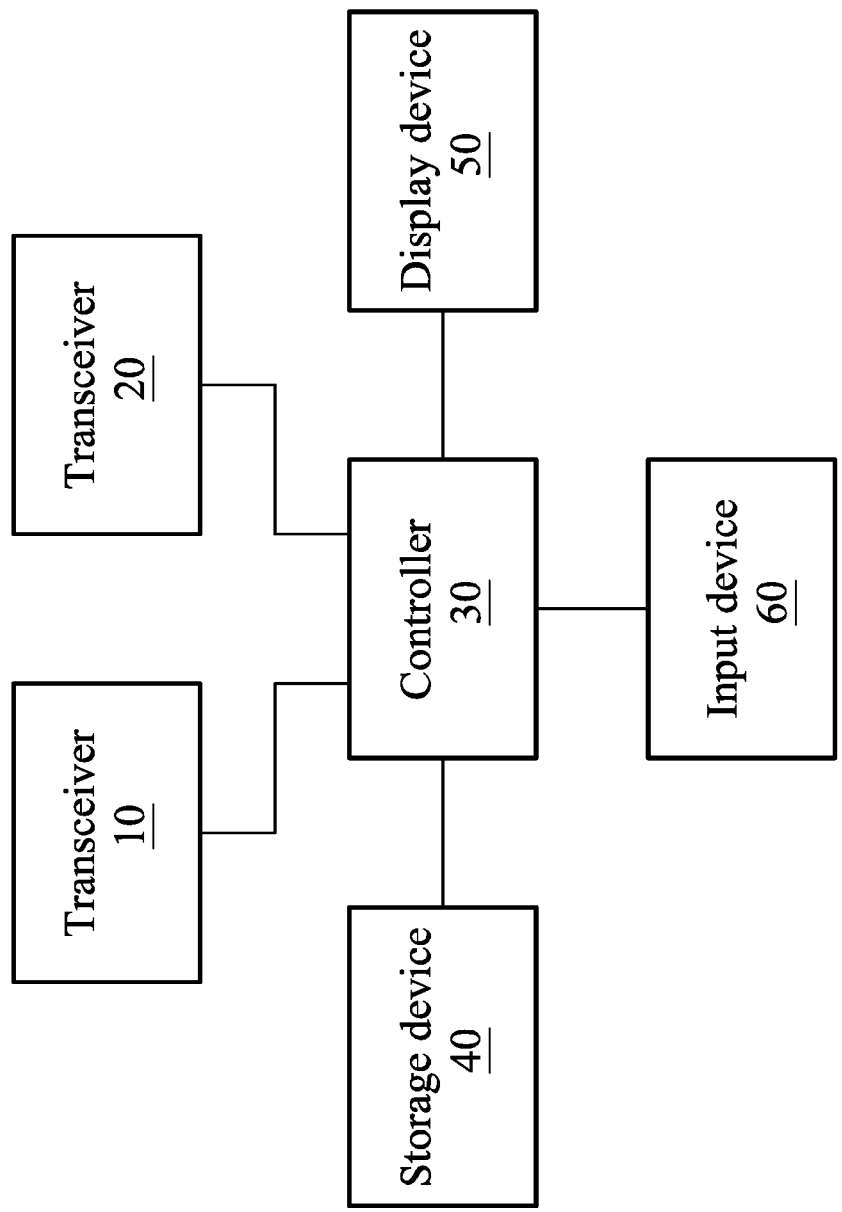
FIG. 3 is a block diagram illustrating a communication device according to an embodiment of the application.

FIG. 3 is a block diagram illustrating a communication device according to an embodiment of the application. A communication device comprises two transceivers 10 and 20, a controller 30, a storage device 40, a display device 50, and an input device 60.

Each of the transceivers 10 and 20 may be a wired transceiver which includes various circuitry for providing wired communications to the service network 130 or 140, or may be a wireless transceiver which includes various circuitry for providing wireless communications to the service network 130 or 140.

For a wired transceiver, it may comprise a wired interface, such as a cable modem, an ADSL modem, a FOM, or an Ethernet network interface, which consists of various circuitry for providing wired communications.

For a wireless transceiver, it may comprise a Radio Frequency (RF) device, a baseband processing device, and an antenna, wherein each of the RF device, the baseband processing device, and the antenna consists of various circuitry. The baseband processing device is configured to perform baseband signal processing and control the communications between subscriber identity card(s) and the RF device. The baseband processing device may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device may receive RF wireless signals via the antenna, convert the received RF wireless signals to baseband signals, which are processed by the baseband processing device, or receive baseband signals from the baseband processing device and convert the received baseband signals to RF wireless signals, which are later transmitted via the antenna. The RF device may also contain multiple hardware devices to perform radio frequency conversion.

For example, the RF device may comprise a mixer to multiply the baseband signals with a carrier oscillated in the radio frequency of the supported wireless technologies, wherein the radio frequency may be 2.4 GHz, 3.6 GHz, 4.9 GHz, or 5 GHz utilized in WiFi/BT technology, or may be 900 MHz, 1800 MHz or 1900 MHz utilized in GSM/GPRS/EDGE technology, or may be 900 MHz, 1900 MHz or 2100 MHz utilized in WCDMA technology, or may be 450 MHz, 800 MHz or 1900 MHz utilized in CDMA2000 technology, or may be 900 MHz, 2100 MHz, or 2.6 GHz utilized in LTE/LTE-A/TD-LTE technology, or another radio frequency, depending on the access technology in use.

The controller 30 may be a general-purpose processor, a Micro Control Unit (MCU), an application processor, a Digital Signal Processor (DSP), or the like, which includes various circuitry for providing the functions of a signaling protocol for video call services (e.g., the Session Initiation Protocol (SIP)), a media protocol for video call services (e.g., the Real-time Transport Protocol (RTP)), an Internet-related protocol (e.g., IP/UDP/TCP), a video encoder/decoder (e.g., H.264/265), and handover detection.

Figure 4:
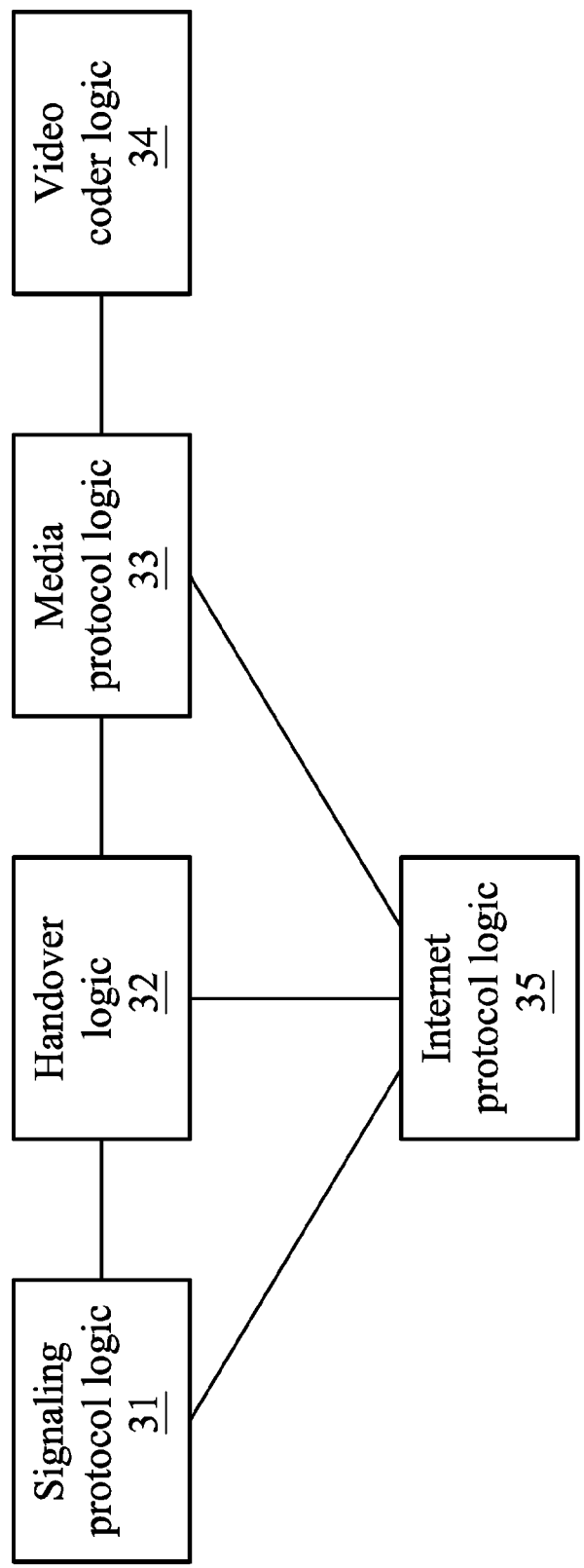
FIG. 4 is a schematic diagram illustrating the logic composition within the controller 30 according to an embodiment of the invention.

FIG. 4 is a schematic diagram illustrating the logic composition within the controller 30 according to an embodiment of the invention. The signaling protocol logic 31 may be implemented with various circuitry, for initiating a video call session. The handover logic 32 may be implemented with various circuitry, for detecting the completion of a handover and informing the media protocol logic 33 about the completion of the handover. The media protocol logic 33 may be implemented with various circuitry, for controlling the video call session, including requesting that the video coder logic 34 generate an intra frame for the remote device 120 and/or requesting that the remote device 120 generate an intra frame for the communication device 110. The video coder logic 34 may be implemented with various circuitry, for encoding and decoding of video frames. The Internet protocol logic 35 may be implemented with various circuitry, for data transmission and reception following the IP/UDP/TCP standard.

In addition, the controller 30 is responsible for controlling the wireless transceivers 10 and 20 for wired/wireless communications with the service network 130 or 140, storing and retrieving data to and from the storage device 40, sending a series of frame data (e.g. representing text messages, graphics, images, etc.) to the display device 50, and receiving signals from the input device 60. In particular, the controller 30 coordinates the aforementioned operations of the wireless transceivers 10 and 20, the storage device 40, the display device 50, and the input device 60 for performing the method of the present application.

As will be appreciated by persons skilled in the art, the circuitry of the controller 30 will typically include transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 40 is a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of applications, communication protocols, and/or the method of the present application.

The display device 50 may be a Liquid-Crystal Display (LCD), Light-Emitting Diode (LED) display, or Electronic Paper Display (EPD), etc., for providing a display function. For example, the display device 50 may be configured to display the video frames of a video call. Alternatively, the display device 50 may further comprise one or more touch sensors disposed thereon or thereunder for sensing touches, contacts, or approximations of objects, such as fingers or styluses.

The input device 60 may comprise a video camera, and one or more buttons, a keyboard, a mouse, a touch pad, a microphone, and/or a speaker, etc., to serve as the Man-Machine Interface (MMI) for interaction with users.

It should be understood that the components described in the embodiment of FIG. 3 are for illustrative purposes only and are not intended to limit the scope of the application.

Referring back to FIG. 2, the remote device 120 is connected to the Internet though any connection means (e.g., a wired/wireless network), while the communication device 110 which was initially wired/wirelessly connected to the service network 130 is being handed over to the service network 140 during a video call with the remote device 120. That is, in the perspective of the communication device 110, the video call is handed over from the communication link with the service network 130 to the communication link with the service network 140. A detailed description regarding the handover of the video call is illustrated in FIG. 5.

Figure 5:
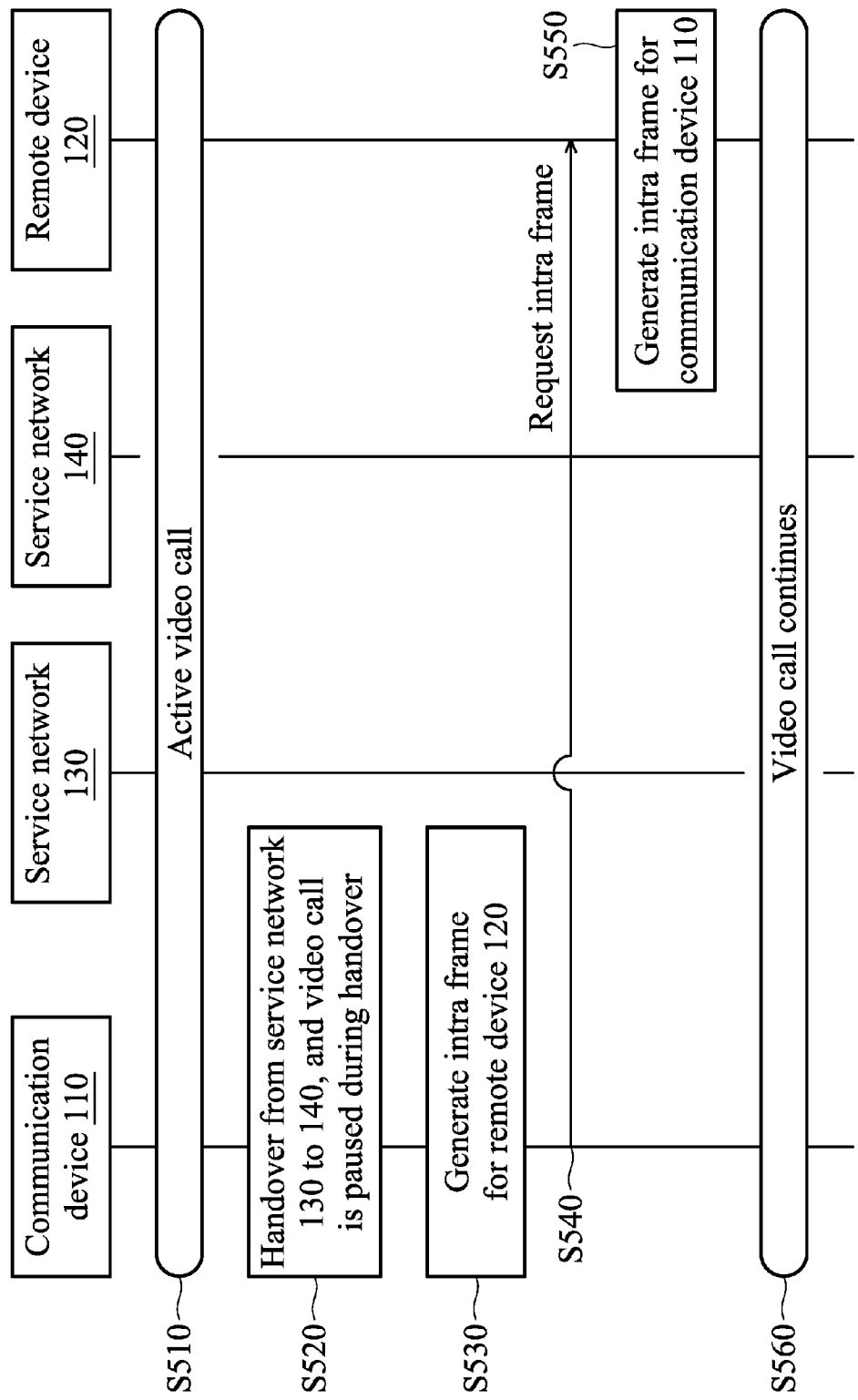
FIG. 5 is a message sequence chart illustrating a handover occurred during a video call according to an embodiment of the application.

FIG. 5 is a message sequence chart illustrating a handover occurred during a video call according to an embodiment of the application. To begin, the communication device 110 is having a video call with the remote device 120 via a communication link provided by the service network 130 (step S510). During the video call, the communication device 110 detects that it has been handed over from the service network 130 to the service network 140, and the video call is paused during the handover (step S520). That is, the communication device 110 is having the same video call with the remote device 120 via a communication link provided by the service network 140. For example, if the service networks 130 and 140 are an LTE network and a WiFi network, respectively, the handover may be referred to as a Video-over-LTE (ViLTE) to Video-over-WiFi (ViWiFi) handover.

In response to the completed handover, the communication device 110 generates an intra frame (also called a full frame) for the remote device 120 (step S530), and requests that the remote device 120 generate an intra frame for the communication device 110 (step S540). Specifically, the intra frame for the remote device 120 is generated to ensure the remote device 120 will not experience any video artifacts on the video stream it receives, and the intra frame may be generated using a video encoder/decoder, such as H.264 or H.265. The request to the remote device 120 for generating the intra frame for the communication device 110 is made to avoid any video artifacts on the video decoded and displayed, and the request may be carried out through a media protocol, such as the RTP Control Protocol (RTCP) or SIP. For a detailed description of step S540 for ViLTE-to-ViWiFi handovers, reference may be made to the 3GPP Technical Specification (TS) 26.114.

In another embodiment, the communication device 110 may choose to perform only one of the steps S530 and S540. That is, the communication device 110 either generates an intra frame for the remote device 120, or requests that the remote device 120 generate an intra frame for the communication device 110, such that at least one of the communication device 110 and the remote device 120 may not experience video artifacts during the video call.

When receiving the request, the remote device 120 generates an intra frame for the communication device 110 (step S550). After that, the video call continues without any video artifacts, due to both the communication device 110 and the remote device 120 having the intra frame from each other (step S560). That is, the video feed of the video call may get back in-sync once the communication device 110 and the remote device 120 decode the intra frames received from each other.

In addition to handovers, the present application also aims to avoid video artifacts caused by Out-Of-Service (OOS) conditions.

Figure 6:
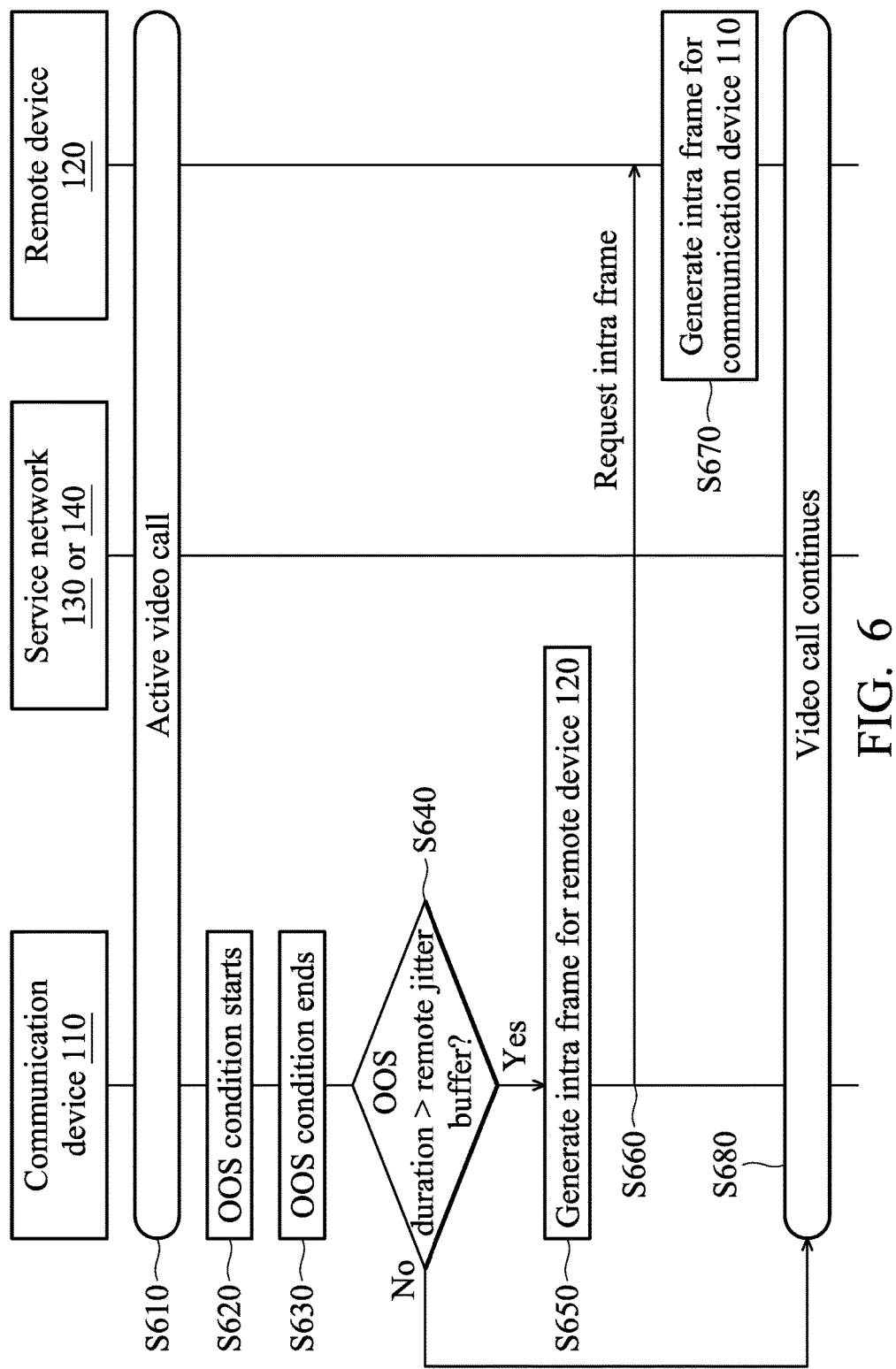
FIG. 6 is a message sequence chart illustrating an OOS condition occurred during a video call according to an embodiment of the application.

FIG. 6 is a message sequence chart illustrating an OOS condition occurred during a video call according to an embodiment of the application. To begin, the communication device 110 is having a video call with the remote device 120 via a communication link provided by the service network 130 or 140 (step S610). During the video call, the communication device 110 detects that it is out of service with the service network 130 or 140 (step S620). Next, when the service with the service network 130 or 140 is successfully recovered (step S630), the communication device 110 determines whether the duration of the OOS condition (i.e., the period of time which the OOS condition lasted) is greater than a remote jitter buffer associated with the video call (step S640). Specifically, the remote jitter buffer refers to a buffer (which may be implemented inside a media transport protocol, e.g., the RTP) in a static or dynamic size for temporarily storing a number of received RTP packets in downlink direction, and when the playback (e.g., a video decoder) requests a new frame to be decoded, the next frame is retrieved from the remote jitter buffer using the media protocol information, such as RTP timestamp and/or RTP sequence number.

In this embodiment, it is assumed that the duration of the OOS condition is greater than the remote jitter buffer, so the communication device 110 generates an intra frame for the remote device 120 (step S650), and requests that the remote device 120 generate an intra frame for the communication device 110 (step S660). Alternatively, if the duration of the OOS condition is equal to or less than the remote jitter buffer, the media protocol (e.g., RTP) of the video call may take care of the gap introduced by the OOS condition with the help of its de-jitter buffer and the video call will continue without issues, but this is beyond the scope of the present application.

In another embodiment, the communication device 110 may choose to perform only one of the steps S650 and S660. That is, the communication device 110 either generates an intra frame for the remote device 120, or requests that the remote device 120 generate an intra frame for the communication device 110, such that at least one of the communication device 110 and the remote device 120 may not experience video artifacts during the video call.

When receiving the request, the remote device 120 generates an intra frame for the communication device 110 (step S670). After that, the video call continues without any video artifacts (step S680).

In another embodiment, if the remote jitter buffer is unknown, then in step S640, the communication device 110 may instead be configured to determine whether there have been any video frame transmission failures during the OOS condition, and the method flow proceeds to step S650 when it is determined that there is a video frame transmission that failed during the OOS condition. Alternatively, if the remote jitter buffer is unknown, the communication device 110 may use its own jitter buffer length.

In view of the forgoing embodiments of FIGS. 5 and 6, it will be appreciated that the present application avoids video artifacts introduced by handovers or OOS conditions, by requesting that both parties to the video call (or at least one of them) generate an intra frame upon the completion of handovers or OOS conditions. Advantageously, user experience with real-time video communication services is significantly improved.

While the application has been described by way of example and in terms of preferred embodiment, it is to be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A communication device, in a video call with a remote device, comprising:
   first circuitry, configured to provide a first communication link to the remote device using a first access technology;
   second circuitry, configured to provide a second communication link to the remote device using a second access technology;
   third circuitry, configured to detect that a handover of the video call from the first communication link to the second communication link or an Out-Of-Service (OOS) condition of the first or second communication link has started during transmission of a first inter frame of the video call; and
   fourth circuitry, configured to generate a first intra frame, in contrast to a second inter frame, for the remote device or request that the remote device generate a second intra frame for the communication device, in response to that the handover or the OOS condition has ended before transmission of the second inter frame of the video call.

2. The communication device of claim 1, further comprising:
   fifth circuitry, configured to determine whether a duration of the OOS condition is greater than a remote jitter buffer associated with the video call or whether there is any video frame transmission failed in the duration of the OOS condition, when the OOS condition occurred during the video call has ended;
   wherein the generation of the first intra frame is performed or the request to the remote device is made, when the duration of the OOS condition is greater than the remote jitter buffer or when there is a video frame transmission failed in the duration of the OOS condition.

3. The communication device of claim 1, wherein the request to the remote device is made using a Real-time Transport Control Protocol (RTCP) or Session Initiation Protocol (SIP).

4. The communication device of claim 1, wherein the first access technology and the second access technology are any two of the following:
   one of a General Packet Radio Service (GPRS) technology, an Enhanced Data rates for Global Evolution (EDGE) technology, a Wideband Code Division Multiple Access (WCDMA) technology, a Code Division Multiple Access 2000 (CDMA2000) 1x technology, a Time Division-Synchronous Code Division Multiple Access (TD-SCDMA) technology, a Long Term Evolution (LTE) technology, a Time-Division LTE (TD-LTE) technology, and a LTE-Advanced (LTE-A) technology;
   a Worldwide Interoperability for Microwave Access (Wi-MAX) technology;
   a Wireless Fidelity (WiFi) technology;
   a Bluetooth (BT) technology; and
   an Ethernet technology.

5. A method for avoiding video artifacts introduced by a handover or Out-Of-Service (OOS) condition during a video call between a communication device and a remote device, executed by the communication device comprising a video encoder circuitry, the method comprising:
   providing a first communication link to the remote device using a first access technology and a second communication link to the remote device using a second access technology;
   detecting that a handover of the video call from the first communication link to the second communication link or an Out-Of-Service (OOS) condition of the first or second communication link has started during transmission of a first inter frame of the video call; and generating, by the video encoder circuitry, a first intra frame, in contrast to a second inter frame, for the remote device or requesting that the remote device generate a second intra frame for the communication device, in response to that the handover or the OOS condition has ended before transmission of the second inter frame of the video call.

6. The method of claim 5, further comprising:

determining whether a duration of the OOS condition is greater than a remote jitter buffer associated with the video call or whether there is any video frame transmission failed in the duration of the OOS condition, when the OOS condition occurred during the video call has ended;

wherein the generation of the first intra frame is performed or the request to the remote device is made, when the duration of the OOS condition is greater than the remote jitter buffer or when there is a video frame transmission failed in the duration of the OOS condition.

7. The method of claim 5, wherein the request to the remote device is made using a Real-time Transport Control Protocol (RTCP) or Session Initiation Protocol (SIP).

8. The method of claim 5, wherein the first access technology and the second access technology are any two of the following:

one of a General Packet Radio Service (GPRS) technology, an Enhanced Data rates for Global Evolution (EDGE) technology, a Wideband Code Division Multiple Access (WCDMA) technology, a Code Division Multiple Access 2000 (CDMA2000) 1x technology, a Time Division-Synchronous Code Division Multiple Access (TD-SCDMA) technology, a Long Term Evolution (LTE) technology, a Time-Division LTE (TD-LTE) technology, and a LTE-Advanced (LTE-A) technology;

a Worldwide Interoperability for Microwave Access (Wi-MAX) technology;

a Wireless Fidelity (WiFi) technology;

a Bluetooth (BT) technology; and an Ethernet technology.

\* \* \* \* \*